Nov. 22, 1960  H. E. VANCE  2,961,556
STATOR CORE MEMBERS FOR DYNAMOELECTRIC MACHINES
Filed Dec. 23, 1958
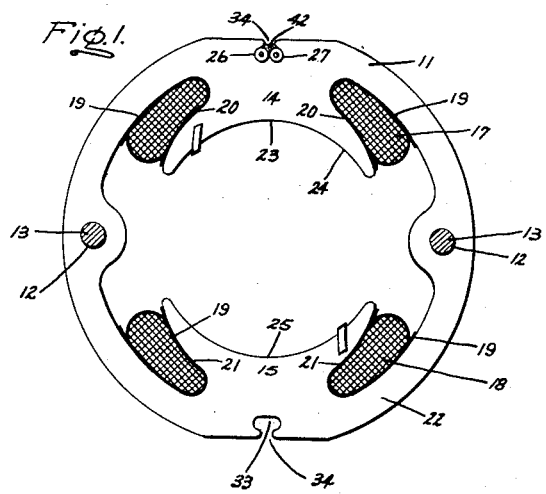
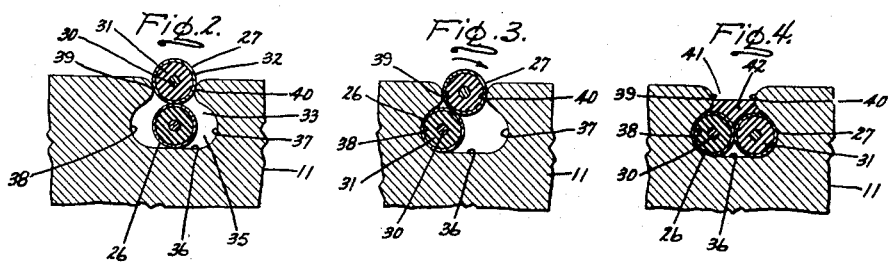
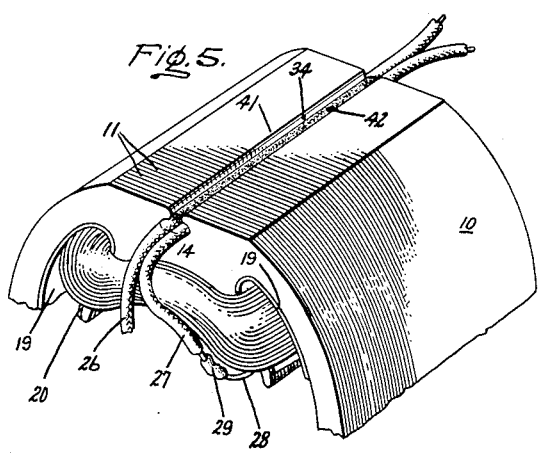
Inventor:
Henry E. Vance,
by H. F. Manbeck, Jr.
Attorney.

United States Patent Office 2,961,556
Patented Nov. 22, 1960

2,961,556

STATOR CORE MEMBERS FOR DYNAMO-ELECTRIC MACHINES

Henry E. Vance, Fort Wayne, Ind., assignor to General Electric Company, a corporation of New York Filed Dec. 23, 1958, Ser. No. 782,517

6 Claims. (Cl. 310—216)

This invention relates to stators for dynamoelectric machines and more particularly, to the manner in which the energizing wire leads of the windings are held stationary relative to such stators.

In dynamoelectric machines having a stationary field member or stator and exciting coil conductors or field windings, it is highly desirable to secure firmly the energizing external wire leads, which are connected to the coil ends of the winding, in a predetermined stationary position relative to the stator and to the windings. For example, an excessive movement of the leads with respect to the stator may cause the outer covering or insulation of the lead wires to wear through, exposing the current carrying wire, and thereby increasing the possibility of short circuiting the windings. In addition, if tension is permitted on the connection or joint between the external leads and the coil ends, they may separate thereby opening the circuit. Thus, either event interferes with the proper operation of the machine. Heretofore, it has been customary in the manufacture of dynamoelectric machines to secure the external wire leads, either by tying the leads directly to the end turns of the windings by means of string or the like, or by fastening the leads by means of a clamping assembly. Both of these arrangements have been expensive, both from the standpoint of the cost of material used and in the cost of the time required to secure the leads in place.

Accordingly, it is an object of my invention to provide a simple and more economical means for retaining the leads stationary relative to the windings and to the stator member.

Another object of my invention is to provide the stator member with a configuration adapted to cooperate with and hold firmly external wire leads stationary with respect to the stator and windings.

Another object of this invention is to eliminate the costly securing means heretofore used for retaining the external leads in a stationary manner.

Further objects and advantages will become apparent as the following description proceeds and the subject matter which I regard as my invention is pointed out with particularity in the claims annexed to and forming a part of this specification.

In carrying out the objects of the present invention in one form thereof, I provide an electric motor having a stator core member with coil windings arranged thereon. The stator member consists of a stack of laminations, each lamination being provided with at least one notch disposed on the outer peripheral surface thereof and adapted to receive a pair of insulated energizing wire leads. The notch has two opposed arcuate lip portions forming an entrance of reduced width and two opposed side edges and a bottom edge defining an inner lead wire receiving recess or chamber. The individual laminations are secured together by suitable means, with the notches aligned to define a transverse groove. This groove, which communicates with the outer surface of the core member, has a narrow entrance wider than either of the leads, but smaller than their combined width. Preferably, the width of the chamber is slightly less than the combined diameter of the two wire leads which become anchored therein. The wire leads are placed into the groove, through the groove entrance, one at a time, and twisted in such a manner that the leads lie side by side, contiguous to and in frictional engagement with the sides of the groove and with each other. Thus, it can be seen that the leads are tightly wedged into the groove and are held stationary therein. To supplement the retention of the leads within the groove, an adhesive material or other holding means may be applied in the groove on top of the external wire lead members.

For a better understanding of the invention, reference may be had to the accompanying drawing which illustrates one embodiment of the present invention.

In the drawings:

Figure 1 is an end view, partially in section, of a laminated stator for a dynamoelectric machine illustrating the construction of the present invention;

Figure 2 is an enlarged sectional view of a portion of the structure shown in Figure 1, showing the present invention during the initial steps of assembly;

Figure 3 is a similar view to Figure 2, showing one wire lead disposed within the groove in its relatively final position with the second wire lead being rotated through the groove entrance;

Figure 4 is a similar view to Figure 2 with both leads disposed within the groove in their secured position; and Figure 5 is a fragmentary perspective view of the stator showing the wire leads after their assembly into the stator groove.

Referring to the drawing in more detail, the preferred form of the improved construction of the present invention is illustrated in Figures 1 through 5 inclusive as being applied to the stator of a two pole induction electric motor. As shown therein, a laminated stator core member, generally indicated at 10, comprises a stack of identical laminations 11, punched or stamped from suitable magnetic sheet material. The individual laminations are provided with a plurality of suitably disposed holes or apertures 12, adapted to receive fastening means, such as bolts 13, to secure the stack of laminations rigidly together.

The laminations are of the salient pole type and in particular the stator 10 is formed with two opposed salient poles 14 and 15. Positioned around the necks of the poles are coiled conductors forming respectively field exciting windings 17 and 18. The conductors are of the customary resin insulated, magnet wire type and suitable fiber lines 19 are positioned between the windings and the surfaces of poles 20 and 21 respectively, and the stator yoke 22 to insulate the windings from the stator. As shown in Fig. 5, the end turns of the windings are formed or bowed upwardly to avoid protruding into the bore 23 defined by the arcuate tips 24 and 25 of the poles. If desired, coil end turns may be held away from the bore 23 by any suitable means, such as by winding pins (not shown). The windings 17 and 18 are connected to a power source (not shown) through a pair of external leads 26 and 27, which are connected to the ends 28 of windings 17 and 18, such as by the brazed connection indicated at 29. For convenience of representation, only one connection is illustrated in Fig. 5. Leads 26 and 27 are of standard construction, each having a central wire of conductive material 30 embedded in suitable insulation 31, such as rubber, with an outer protective covering 32 of fabric or other suitable material.

Now, in accordance with the preferred embodiment of the present invention, each lamination 11 is provided with at least one notch 33 contiguous to and in communication with the outer surface thereof. Although Figs. 1 and 5 illustrate a pair of notches 33 so located in the individual laminations that they form diametrically opposed grooves 34 extending transversely and straight across the stack or core member when the individual laminations are aligned, it should be obvious that this is by way of illustration only since symmetrical and identical laminations are relatively inexpensive to produce and easy to use, and if desired, the notches may be so positioned that the transverse groove could extend obliquely across the core member without a departure from the true scope and spirit of this invention.

As more clearly revealed in Fig. 2, it will be seen that in the preferred embodiment, notch 33 is formed with an inner recess or chamber 35 adapted to receive wire leads 26 and 27. Chamber 35 is defined by a relatively flat bottom wall or edge 36 and a pair of opposed substantially arcuate or concave side walls or edges 37 and 38 respectively. As shown, the contour of the side edges conform substantially to the outer surface configuration of the leads. In addition, for reasons which will become more apparent as the description proceeds, it is desirable that the dimensional width of chamber 35 be slightly less than the sum of the combined diameters of the two leads 26 and 27. Upper wall portions or lips 39 and 40, disposed opposite each other, define the notch opening or entrance 41 (see Fig. 4). These wall portions are curved or arcuate in shape in order to facilitate the assembly of the leads within the chamber 35 and further, and in particular, to insure that the protective covering 32 and insulation 31 will not be pierced, scraped or otherwise affected during assembly. Preferably, the width of entrance 41 should be slightly larger than the diameter of a single lead, or if leads of different diameters are used, then the width should be slightly larger than the diameter of the larger lead. The purpose of the reduced dimension for the entrance 41 will become more apparent from the description set forth hereinafter.

With specific reference to Figs. 2-4 inclusive, the pair of external leads 26 and 27 are assembled within groove 34 by initially placing one lead, 26, into the groove and thereafter positioning the second lead, 27, in the entrance 41. As shown in Fig. 3, the upper lead 27 is then rotated in the direction indicated by the arrow, causing the lower lead 26 to roll into engagement with the curved side edge 38. Continued rotation of upper lead 27 causes the lead to pass through the entrance 41, rolling between the outer surface of the lead 26 and curved portion 40, and into a relatively final position within chamber 35, as shown in Fig. 4. Since in the preferred embodiment, the width of chamber 35 is slightly less than the sum of the lead diameters, it will be apparent that the two leads become tightly wedged within the groove 34. More specifically, it will be seen that the leads are securely held by the frictional engagement between the arcuate edges 37 and 38, which extend up over a portion of the outer surface of the leads, and the leads themselves.

In those situations where it is desired to further insure that the leads are permanently maintained within the groove 34, a resilient wedge (not shown) may be placed within entrance 41. In the alternative, if desired, as disclosed in Fig. 4, an adhesive material 42, such as epoxy resin, may be applied in a plastic state through entrance 41 onto the top of the leads and allowed to harden, thereby rigidly securing the leads within the groove 34.

Thus, it will be readily apparent that the groove configuration and precise cooperation between the leads and the groove eliminates the necessity for expensive clamping assemblies as well as costly assembly procedures wherein the lead wires are tied to the coils. In addition, it will be seen that the improved construction provides for the effective securement of the external leads in a predetermined stationary position relative to the stator and to the coil windings, thereby insuring that the leads will not readily become loose and/or detached from the windings once assembled. Moreover, with the use of the present stator arrangement, the leads are held below the periphery of the stator core laminations, and therefore, will not be susceptible of being pinched in those constructions in which portions of the end shields and motor frame are assembled in juxtaposed relation to the peripheral surface of the stator core member.

While the present invention has been described by reference to a particular embodiment thereof, it is to be understood that modifications may be made by those skilled in the art without actually departing from the invention thereof. Therefore, I aim in the appended claims to cover all such equivalent variations as come within the true spirit and scope of the invention.

What I claim as new and desire to secure by Letters Patent of the United States is:

1. A dynamoelectric machine stator member comprising a magnetic core member having a bore, an outer peripheral surface, and means for accommodating excitation windings disposed adjacent said bore, at least one field exciting winding positioned on said core member and carried by said means, and a pair of external wire leads connected to said winding for energizing said winding, said core member having at least one groove communicating with its outer surface and spaced from said winding accommodating means, said groove having opposed outer walls forming a narrow entrance for insertion of said leads therethrough, said entrance being wider than either of said leads but smaller than their combined width and having an inner chamber dimensionally greater in width than said entrance, said inner chamber defined by a bottom and spaced apart side walls for accommodating said pair of external leads, and said leads extending from said winding through said inner chamber adjacent said bottom wall whereby they are maintained in said stator member and protected from damage.

2. The dynamoelectric machine stator member of claim 1 wherein the dimensional width of the chamber is slightly less than the combined outer diameters of the external leads disposed therein, to provide a retaining action on said leads.

3. The dynamoelectric machine stator member of claim 1 wherein means are disposed within said groove on top of said leads for maintaining said leads stationary relative to said stator member.

4. A dynamoelectric machine stator member comprising a stack of laminations rigidly secured together forming a magnetic core member having a bore, an outer peripheral surface, and means for accommodating excitation windings disposed adjacent said bore, at least one field exciting winding positioned on said core member and carried by said means, and a pair of external wire leads connected to said winding for energizing said winding, each lamination having at least one notch communicating with its outer surface, said notch formed with an inner chamber defined by a bottom edge and spaced apart curved side edges for accommodating said pair of external leads, said notch having upper opposed arcuate lips defining a narrow entrance to said chamber for inserting said leads therethrough, said notches of all the laminations being aligned to form a groove extending transversely across the periphery of said core member, said groove having a narrow entrance wider than either of said leads but smaller than their combined width and a relatively wide inner chamber, and said leads extending from said winding through said groove in frictional engagement with a portion of said bottom and side edges whereby said leads are maintained stationary relative to said stator member and protected from damage.

5. An article of manufacture comprising a punched or stamped lamination for use in a stator core member for a dynamoelectric machine having a bore, means for accommodating excitation windings adjacent said bore, and at least one notch provided at the outer periphery of said lamination, said notch including a narrow entrance for inserting a pair of external wire leads therethrough and a relatively wide chamber for receiving said wire leads, said entrance being formed by opposed lips of arcuate configuration, and said chamber being defined by a bottom edge and a pair of arcuate side edges for engaging a portion of the outer surfaces of the leads.

6. A dynamoelectric machine stator member comprising a magnetic core member having a bore, an outer peripheral surface, and means for accommodating excitation windings disposed adjacent said bore, at least one excitation winding positioned on said core member and carried by said means, and a pair of external wire leads connected to said winding for energizing said winding, said core member having at least one groove communicating with its outer surface and spaced from said winding accommodating means, said groove formed with an inner chamber defined by a bottom wall and spaced apart side walls for accommodating said pair of external leads and formed with upper opposed arcuate lips defining a narrow entrance to said inner chamber, said entrance being wider than either of said leads but smaller than their combined width, each of said side walls substantially conforming in contour to the curvature of the outer surfaces of said leads, said leads disposed in said groove in side-by-side relation adjacent said bottom wall, a portion of each of said leads in frictional engagement with the respective adjacent curved side walls whereby said leads are maintained stationary relative to said stator member inwardly of said outer peripheral surface of said core member and protected from damage.

References Cited in the file of this patent

UNITED STATES PATENTS

| | | |
|---|---|---|
| 2,581,445 | Riley et al. | Jan. 8, 1952 |
| 2,873,304 | Davidson | Feb. 10, 1959 |

FOREIGN PATENTS

| | | |
|---|---|---|
| 448,857 | France | Dec. 7, 1912 |
| 472,691 | Germany | Feb. 14, 1929 |

Disclaimer 2,961,556.—*Henry E. Vance*, Fort Wayne, Ind. STATOR CORE MEMBERS FOR DYNAMO-ELECTRIC MACHINES. Patent dated Nov. 22, 1960. Disclaimer filed Aug. 17, 1964, by the assignee, *General Electric Company*.
Hereby enters this disclaimer to claims 1 and 3 of said patent.
[*Official Gazette December 1, 1964.*]